United States Patent
He et al.

(10) Patent No.: US 12,093,810 B2
(45) Date of Patent: Sep. 17, 2024

(54) CONVOLUTION PROCESSING ENGINE AND CONTROL METHOD, AND CORRESPONDING CONVOLUTIONAL NEURAL NETWORK ACCELERATOR

(71) Applicant: BEIJING HORIZON ROBOTICS TECHNOLOGY RESEARCH AND DEVELOPMENT CO., LTD., Beijing (CN)

(72) Inventors: Haoqian He, Beijing (CN); Jianjun Li, Beijing (CN); Chang Huang, Beijing (CN)

(73) Assignee: BEIJING HORIZON ROBOTICS TECHNOLOGY RESEARCH AND DEVELOPMENT CO., LTD., Beijing (CN)

( * ) Notice: Subject to any disclaimer, the term of this patent is extended or adjusted under 35 U.S.C. 154(b) by 731 days.

(21) Appl. No.: 17/290,519

(22) PCT Filed: Nov. 4, 2019

(86) PCT No.: PCT/CN2019/115341
§ 371 (c)(1),
(2) Date: Apr. 30, 2021

(87) PCT Pub. No.: WO2020/093968
PCT Pub. Date: May 14, 2020

(65) Prior Publication Data
US 2022/0004855 A1    Jan. 6, 2022

(30) Foreign Application Priority Data
Nov. 6, 2018 (CN) .......................... 201811323140.7

(51) Int. Cl.
G06F 3/06 (2006.01)
G06N 3/04 (2023.01)
G06N 3/063 (2023.01)

(52) U.S. Cl.
CPC ........... *G06N 3/063* (2013.01); *G06F 3/0658* (2013.01); *G06N 3/04* (2013.01)

(58) Field of Classification Search
CPC ... G06F 3/0658; G06F 3/9658; G06N 3/0464; G06N 3/063; G06N 3/04; G06N 3/045
See application file for complete search history.

(56) References Cited

U.S. PATENT DOCUMENTS

2016/0179434 A1\* 6/2016 Herrero Abellanas ...................... G06F 3/0604 711/155
2016/0182671 A1   6/2016 Dakhane et al.
(Continued)

FOREIGN PATENT DOCUMENTS

| CN | 105184366 A | 12/2015 |
| CN | 106779060 A | 5/2017 |

(Continued)

OTHER PUBLICATIONS

Chinese first Office Action dated Apr. 29, 2020 for related Chinese Appln. No. 2018113231407; 15 Pages.
(Continued)

*Primary Examiner* — Khoa D Doan
(74) *Attorney, Agent, or Firm* — Brooks Kushman P.C.

(57) ABSTRACT

Disclosed are a convolution processing engine and a control method thereof, and a convolutional neural network accelerator comprising the convolution processing engine. The convolution processing engine comprises at least two cache memories connected in series and an operational circuit. The convolution processing engine can realize an efficient con- (Continued)

volution operation with lower complexity and power consumption.

9 Claims, 9 Drawing Sheets

(56) References Cited

U.S. PATENT DOCUMENTS

| | | | |
|---|---|---|---|
| 2017/0221176 | A1 | 8/2017 | Munteanu et al. |
| 2019/0317732 | A1 | 10/2019 | Xu et al. |

FOREIGN PATENT DOCUMENTS

| | | | |
|---|---|---|---|
| CN | 106844294 | A | 6/2017 |
| CN | 106980264 | A | 7/2017 |
| CN | 107239829 | A | 10/2017 |
| CN | 107862650 | A | 3/2018 |
| CN | 108133267 | A | 6/2018 |
| CN | 108182471 | A | 6/2018 |
| CN | 108363559 | A | 8/2018 |
| CN | 108564169 | A | 9/2018 |
| CN | 108629406 | A | 10/2018 |
| CN | 109472355 | A | 3/2019 |

OTHER PUBLICATIONS

Chinese second Office Action dated Sep. 23, 2020, for related Chinese Appln. No. 2018113231407; 4 Pages.

International Search Report dated Jan. 31, 2020 for related PCT Appln. No. PCT/CN2019/115341; 4 Pages.

Kai-Yu Wang, "Implementation and Optimization of Convolutional Neural Networks on FPGA" Labratory Science, vol. 21, No. 4, Aug. 2018; 6 Pages.

* cited by examiner

CONVOLUTION PROCESSING ENGINE AND CONTROL METHOD, AND CORRESPONDING CONVOLUTIONAL NEURAL NETWORK ACCELERATOR

CROSS-REFERENCE TO RELATED APPLICATIONS

This application is the U.S. national phase of PCT Application No. PCT/CN2019/115341 filed on Nov. 4, 2019, which claims priority to Chinese Patent Application No. CN201811323140.7, filed on Nov. 6, 2018, which are incorporated herein by reference in their entireties.

TECHNICAL FIELD

The present disclosure generally relates to the technical field of artificial intelligence, and specifically relates to a convolution processing engine and a control method thereof, and a convolutional neural network accelerator comprising the convolution processing engine.

BACKGROUND

Convolutional neural networks have been successfully applied in many fields such as image processing and autonomous driving. With the continuous development of application requirements, the amount of multiplication and addition operations involved in convolutional neural networks is increasing, and the processing performance of convolutional neural network accelerators used for convolutional neural network operations is also required to be higher and higher.

With the increase of the amount of data and operations, the time consumed by the convolutional neural network accelerator for accessing (comprising reading and writing) data has been increasing dramatically, and in many cases it has become a main constraint on the processing performance of the convolutional neural network accelerator.

Therefore, it is desirable to provide a convolutional neural network accelerator with high-efficiency at a low cost.

SUMMARY

According to an aspect of the present disclosure, a convolution processing engine is provided.

The convolution processing engine comprises at least two cache memories connected in series, wherein, for a preceding cache memory and a succeeding cache memory of any two adjacent cache memories, an output terminal of the preceding cache memory is coupled to an input terminal of the succeeding cache memory, and an input terminal of a first cache memory connected serially at a first position and an output terminal of a second cache memory connected serially at a last position correspond to a first input terminal and an output terminal of the convolution processing engine respectively. Among the at least two cache memories, the first cache memory is used to receive and cache data from an outside of the convolution processing engine, and the second cache memory is used to output the cached data to an outside of the convolution processing engine.

The convolution processing engine further comprises an operational circuit, wherein an input terminal of the operational circuit is coupled to an output terminal of each of the at least two cache memories, and an output terminal of the operational circuit is coupled to an input terminal of each of the at least two cache memories. The operational circuit may comprise a multiplier-accumulator array.

According to another aspect of the present disclosure, there is also provided a convolutional neural network accelerator comprising the convolution processing engine.

According to another aspect of the present disclosure, there is also provided a method for controlling the convolution processing engine, comprising:

determining a correspondence between at least two consecutive layers in a convolutional neural network to be processed and the at least two cache memories, wherein a corresponding portion of a cache memory will be used to store feature data involved in an operation of a corresponding layer, and wherein a corresponding cache memory of input feature data of a first layer of the at least two layers is the first cache memory, and a corresponding cache memory of output feature data of a last layer of the at least two layers is the second cache memory;

receiving first input feature data from an outside of the convolution processing engine and storing it into a first corresponding portion of the first cache memory, the first input feature data being first portion data of an original and complete input feature data of the first layer; and controlling the operational circuit to perform a first operation, the first operation comprising reading the first input feature data from the first corresponding portion, and sequentially performing an operation of each layer starting from the first layer based on the first input feature data and storing a first output feature data obtained by an operation of each layer into a corresponding portion of a corresponding cache memory.

According to another aspect of the present disclosure, there is also provided a computer-readable non-transitory storage medium, on which program instructions are stored. When executed, the program instructions at least execute the above method for controlling a convolution processing engine.

The convolution processing engine or the convolutional neural network accelerator comprising the same according to an embodiment of the present disclosure can efficiently implement convolution operations with very low hardware design complexity, control complexity, cost, and power consumption.

BRIEF DESCRIPTION OF THE DRAWINGS

Through a more detailed description of the embodiments of the present disclosure in conjunction with the accompanying drawings, the above and other objectives, features, and advantages of the present disclosure will become more apparent. The accompanying drawings are used to provide a further understanding of the embodiments of the present disclosure, and constitute a part of the specification, which explain the present disclosure together with the embodiments of the present disclosure, but do not constitute a limitation to the present disclosure. In the drawings, the same reference numerals generally represent the same components or steps. In addition, the arrows in the figure indicate the flow of data, that is, the arrowed end of a connecting line is connected to an input terminal of the device/circuit/module/unit, and the end without the arrow is connected to an output terminal of the device/circuit/module/unit. In the case of using a connecting line without an arrow, it means that no limitation is made with respect to the data flow between the devices/circuits/modules/units connected to the two ends of the connecting line, or the data can flow in both directions simultaneously or asynchronously.

DETAILED DESCRIPTION

Figure 1:
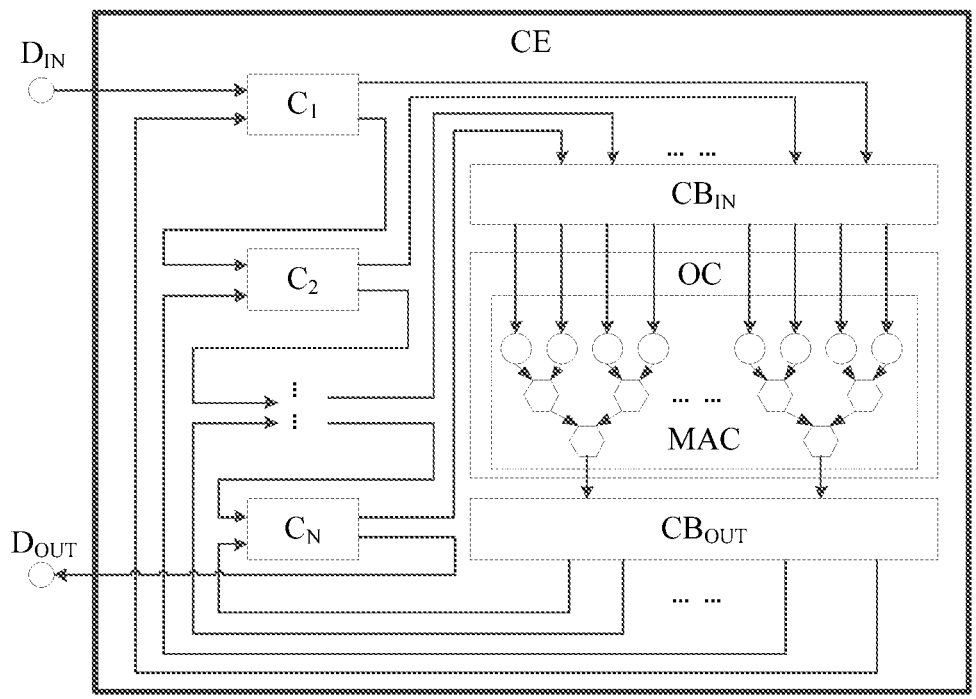
FIG. 1 shows an example of a convolution processing engine according to an embodiment of the present disclosure.

Hereinafter, exemplary embodiments according to the present disclosure will be described in detail with reference to the accompanying drawings. Obviously, the described embodiments are only a part of the embodiments of the present disclosure, rather than all the embodiments of the present disclosure, and it should be understood that the present disclosure is not limited to the exemplary embodiments described herein.

Overview

In order to improve the processing efficiency of a convolution processing engine or a convolutional neural network accelerator, an input cache memory for caching input data and an output cache memory for caching output data may be arranged in the convolution processing engine. Each of the input cache memory and the output cache memory may comprise one or more cache memories connected in parallel.

A host processor in the convolutional neural network accelerator can access each of the input cache memory and the output cache memory, for example, via an off-chip data transfer manager, and the convolution processing engine can access each of the input cache memory and the output cache memory which are separately arranged, via, for example, a crossbar.

For example, because general processing tends to access the data which is recently accessed or data near these data, when the host controller decides that it needs to read data from low-speed memory (for example, an off-chip memory) storing the data and instructs the convolution processing engine to perform operations, the host controller can control (for example, via an intermediate control circuit such as an access controller or an off-chip data transfer manager) to read several data comprising target data from the low-speed memory to the input cache memory. If the cache memory is full, the least frequently accessed data may be controlled to be ejected from the input cache memory first.

Exemplary Convolution Processing Engine

A convolution processing engine according to an embodiment of the present disclosure may comprise at least two serially connected cache memories and an operational circuit.

Among the at least two serially connected cache memories, for a preceding cache memory and a succeeding cache memory of any two adjacent cache memories, an output terminal of the preceding cache memory is coupled to an input terminal of the succeeding cache memory, and an input terminal of a first cache memory serially connected at the first position and an output terminal of a second cache memory serially connected at the last position correspond to a first input terminal and an output terminal of the convolution processing engine, respectively. In addition, among the at least two cache memories, the first cache memory is used to receive and cache data from an outside of the convolution processing engine, and the second cache memory is used to output the cached data to an outside of the convolution processing engine.

The input terminal of the operational circuit is coupled to an output terminal of each of the at least two cache memories, and the output terminal of the operational circuit is coupled to an input terminal of each of the at least two cache memories. The operational circuit may comprise a multiplier and accumulator array.

FIG. 1 shows an example of a convolution processing engine according to an embodiment of the present disclosure. As shown in FIG. 1, the convolution processing engine CE according to an embodiment of the present disclosure may comprise at least two cache memories $C_1$ to $C_N$ (N is an arbitrary integer greater than or equal to 2) connected serially and an operational circuit OC.

For the preceding cache memory $C_i$ and the succeeding cache memory $C_{i+1}$ (i is an integer greater than or equal to 1 and less than N) of any two adjacent cache memories among the cache memories $C_1$ to $C_N$, the output terminal of the preceding cache memory $C_i$ is coupled to the input terminal of the succeeding cache memory For example, the output terminal of the cache memory $C_1$ is coupled to the input terminal of the cache memory $C_2$.

Among the cache memories $C_1$ to $C_N$, the cache memory $C_1$ (that is, the first cache memory described above) connected serially at the first position is used to receive and cache data from the outside of the convolution processing engine CE, and the cache memory $C_N$ connected serially at the last position (that is, the second cache memory described above) is used to output the cached data to the outside of the convolution processing engine CE. In other words, the input terminal of the cache memory $C_1$ and the output terminal of the cache memory $C_N$ may correspond to the input terminal $D_{IN}$ of the convolution processing engine CE (that is, the first input terminal of the convolution processing engine described above) and the output terminal $D_{OUT}$, respectively.

In one embodiment, except for the cache memory $C_1$ and the cache memory $C_N$, any other cache memories of the cache memories $C_1$ to $C_N$ may be configured not to directly exchange data with the outside of the convolution processing engine CE. For example, for any one of the cache memories $C_j$ (i is an integer greater than 1 and less than N, herein, in order to distinguish from the cache memory $C_1$, i.e., the first cache memory, and the cache memory $C_N$, i.e., the second cache memory, the cache memory $C_j$ is also referred to as "the third cache memory") among the cache memories $C_1$ to $C_N$. The cache memory $C_j$ can receive and cache data from another one or more of the cache memories $C_1$ to $C_N$. The cached data can also be provided to the data of another one or more cache memories of the cache memories $C_1$ to $C_N$, but the cache memory $C_j$ does not directly receive data from the input terminal of the processing engine CE and it does not directly output the cached data to the outside of the convolution processing engine CE via the output terminal of the convolution processing engine CE.

In other words, in this embodiment, among the cache memories $C_1$ to $C_N$, only the cache memory $C_1$ is used to receive and cache data from the outside of the convolution processing engine CE, and only the cache memory $C_N$ is used to output the cached data to the outside of the convolution processing engine CE.

For example, in the example of FIG. 1, the cache memory $C_2$ serially connected in the middle of the cache memories $C_1$ to $C_N$ can only receive and cache data from the cache memory $C_1$, and can only output the cached data to the cache memory $C_3$ (not shown) serially connected after the cache memory $C_2$ and cannot directly receive and cache data from the outside of the convolution processing engine CE, nor can it directly output the cached data to the outside of the convolution processing engine CE.

In the example of FIG. 1, for any two adjacent cache memories $C_i$ and $C_{i+1}$ among the cache memories $C_1$ to $C_N$, the output terminal of the preceding cache memory $C_i$ is only coupled to the input terminal of the succeeding cache memory and the input terminal of the succeeding cache memory $C_{i+1}$ is only coupled to the output terminal of the preceding cache memory $C_i$.

As shown in FIG. 1, the operational circuit OC in the convolution processing engine CE according to an embodiment of the present disclosure may comprise a multiplier and accumulator array MAC, as shown in the dashed box part in the example of FIG. 1, wherein a circle may represent multiplier (each multiplier can actually have two or more inputs, which are simply represented by a connecting line in FIG. 1), and the hexagon can represent an adder.

As shown in FIG. 1, the input terminal of the operational circuit OC (which may comprise one or more actual data input ports, for example, each input terminal of each multiplier in the multiplier and accumulator array MAC in the operational circuit OC) may be coupled to the output terminal of each of the cache memories $C_1$ to $C_N$, and the output terminal of the operational circuit OC (which may comprise one or more actual data output ports, for example, each output terminal of each end adder in multiplier and accumulator array MAC in the operational circuit OC) may be coupled to the input terminal of each of the cache memories $C_1$ to $C_N$.

According to different embodiments, different ways can be used to realize the interconnection comprising direct interconnection and indirect interconnection, between the operational circuit OC and the cache memories $C_1$ to $C_N$.

For example, in the example of FIG. 1, each input terminal of each multiplier in the multiplier and accumulator array MAC in the operational circuit OC may be coupled to the output terminal of each of the cache memories $C_1$ to $C_N$ via a crossbar switch $CB_{IN}$, and the output terminal of each end adder in the multiplier and accumulator array MAC in the operational circuit OC can be coupled to the input terminal of each of the cache memories $C_1$ to $C_N$ via a crossbar switch $CB_{OUT}$.

In other embodiments, other appropriate methods such as a shared bus may also be used to implement the interconnection between the operational circuit OC and the cache memories $C_1$ to $C_N$.

In addition, the input terminal of the operational circuit OC may be directly coupled to the output terminal of each of the cache memories $C_1$ to $C_N$, and the output terminal of the operational circuit OC may be directly coupled to the input terminal of each of the cache memories $C_1$ to $C_N$.

In another embodiment, the operational circuit OC in the convolution processing engine CE according to an embodiment of the present disclosure may also comprise other computing components/modules/units/sub-circuits for performing or accelerating operations such as pooling operations, activation processing, and point-wise addition operations that may be involved in a convolutional neural network. Moreover, if necessary, the input and output terminals of these components/modules/units/sub-circuits can also be coupled directly or, for example, via crossbar switches $CB_{IN}$ and $CB_{OUT}$ to output and input terminals of each of the cache memories $C_1$ to $C_N$.

In the convolution processing engine CE according to an embodiment of the present disclosure, there is no need to separately provide an input cache memory and an output cache memory for the operational circuit OC, and only one cache memory $C_1$ is used to receive and cache the external data of convolution processing engine CE, and only one cache memory $C_N$ is used to output data to the outside of the convolution processing engine CE, so it is possible to reduce connecting lines between each cache memory and other components in the convolution processing engine CE and the external components of the convolution processing engine CE (for example, off-chip memory), while reducing the control logic of data transmission, which can greatly reduce the complexity of hardware setting and software control and help reduce power consumption significantly. For example, the host controller in the convolution processing engine CE does not need to access and/or control each cache memory.

In another embodiment, on the basis of the example in FIG. 1, more connecting lines may be provided between the cache memories $C_1$ to $C_N$ in order to provide higher data reading efficiency.

For example, in one embodiment, the output terminal of the first cache memory is coupled to the input terminals of one or more cache memories different from the first cache memory, among the at least two cache memories. In other words, the output terminal of the cache memory $C_1$ can also be coupled to the input terminals of any one or more of the cache memories $C_1$ to $C_N$ except the cache memory $C_1$ among the at least two cache memories, so that the cache memory $C_1$ can directly provide the cached data (comprising the external data received from the input terminal $D_{IN}$ of the convolution processing engine CE) to any other one or more of the cache memories $C_1$ to $C_N$, among the at least two cache memories.

Figure 2:
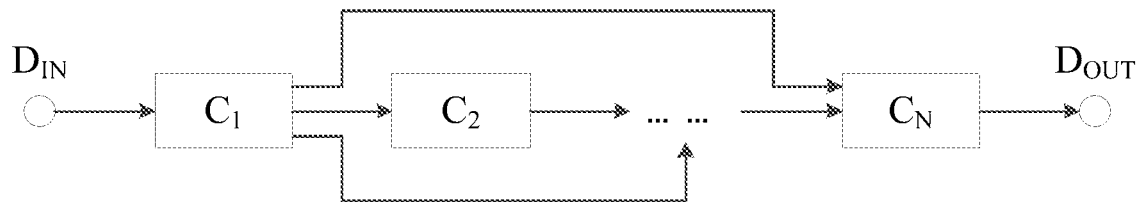
FIG. 2 shows an example of cache memories connected serially in a convolution processing engine according to an embodiment of the present disclosure.

For example, as shown in FIG. 2, on the basis of the connection mode of the cache memories $C_1$ to $C_N$ in the example of FIG. 1, the output terminal of the cache memory $C_1$ may also be coupled to the input terminal of each of the cache memory $C_2$ to the cache memory $C_N$.

In another embodiment, the input terminal of the second cache memory is coupled to the output terminals of one or more cache memories that are different from the second cache memory, among the at least two cache memories. In other words, the input terminal of the cache memory $C_N$ may also be coupled to the output terminal of any one or more of the cache memories $C_1$ to $C_N$ except the cache memory $C_N$, so that the cache memory $C_N$ can directly receive data from one or more other cache memories among the cache memories $C_1$ to $C_N$, which is beneficial to reducing the operations of outputting data to the outside through the output terminal $D_{OUT}$ of the convolution processing engine CE.

Figure 3:
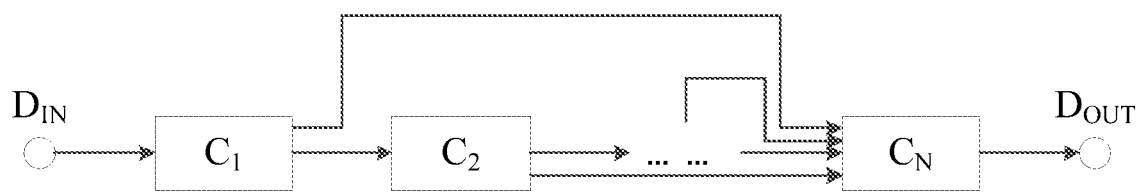
FIG. 3 shows an example of cache memories connected serially in a convolution processing engine according to an embodiment of the present disclosure.

For example, as shown in FIG. 3, based on the connection mode of the cache memory $C_1$ to $C_N$ in the example of FIG. 1, the input terminal of the cache memory $C_N$ may also be coupled to the output terminal of each of the cache memories $C_1$-$C_{N-1}$ (not shown).

In another embodiment, the at least two cache memories may further comprise a third cache memory, the input terminal of which may be coupled to the output terminal of one or more cache memories that is different from the third cache memory, among the at least two cache memories. In other words, the number of cache memories in the cache memories $C_1$ to $C_N$ is greater than or equal to 3, that is, N is an integer greater than or equal to 3, so that the cache memories $C_1$ to $C_N$ may also comprise another cache memory $C_j$ different from the cache memories $C_1$ and $C_N$ (j is an integer greater than 1 and less than N, that is, the third cache memory).

In this embodiment, the input terminal of the cache memory $C_j$ may be coupled to the output terminal of any one or more of the cache memories that is different from the cache memory $C_j$, among cache memories $C_1$ to $C_N$.

Figure 4:
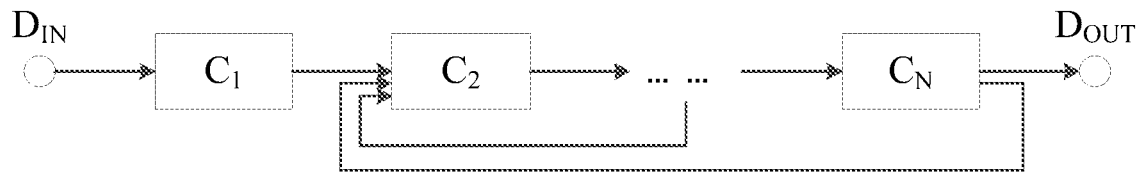
FIG. 4 shows an example of cache memories connected serially in a convolution processing engine according to an embodiment of the present disclosure.

For example, as shown in FIG. 4, based on the connection mode of the cache memories $C_1$ to $C_N$ in the example of FIG. 1, the input terminal of the cache memory $C_2$ may also be coupled to the output terminal of each of the other cache memories, among cache memories $C_1$ to $C_N$.

In this embodiment, the output terminal of the cache memory $C_j$ may also be coupled to the input terminal of any one or more of the cache memories that are different from the cache memory $C_1$ and the cache memory $C_j$, among cache memories $C_1$ to $C_N$.

Figure 5:
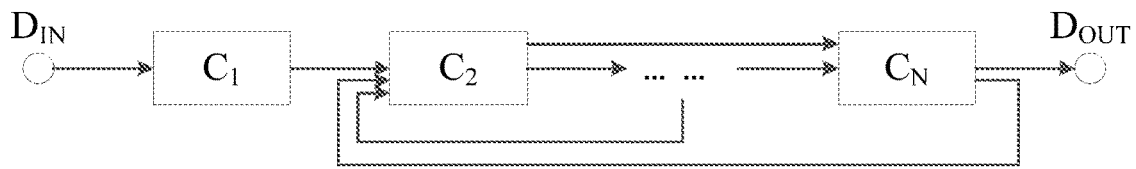
FIG. 5 shows an example of cache memories connected serially in a convolution processing engine according to an embodiment of the present disclosure.

For example, as shown in FIG. 5, the output terminal of the cache memory $C_2$ may also be coupled to the input terminal of the cache memory $C_N$.

In this embodiment, the output terminal of the cache memory $C_j$ may also be coupled to the input terminal of the cache memory $C_1$.

Figure 6:
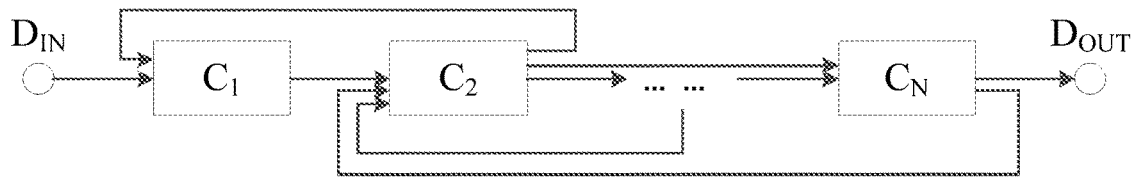
FIG. 6 shows an example of cache memories connected serially in a convolution processing engine according to an embodiment of the present disclosure.

For example, as shown in FIG. 6, the output terminal of the cache memory $C_2$ may also be coupled to the input terminal of the cache memory $C_1$.

In another embodiment, based on or in combination with one or more examples of FIGS. 1 to 6, the connection mode between the cache memories $C_1$ to $C_N$ can be configured to enable the cache memory $C_1$ to provide/write data to any one or more of the other cache memories of the cache memories $C_1$ to $C_N$ in order to enable the cache memory $C_N$ to receive/read data from any other one or more of the cache memories $C_1$ to $C_N$, such the cache memory $C_j$ (j is any integer greater than 1 and less than N) of the cache memories $C_1$ to $C_N$ can provide/write data to any one or more of the cache memories $C_1$ to $C_N$, and/or receive/read data from any one or more of the cache memories $C_1$ to $C_N$.

In different embodiments, the capacity of each of the cache memories $C_1$ to $C_N$ n can be selected according to needs. For example, the capacity of each of the cache memories $C_1$ to $C_N$ may be the same so that the cache areas in the respective cache memories can be allocated and managed in a unified manner.

In addition, in one embodiment, each of the cache memories $C_1$ to $C_N$ may be a cache memory supporting circular addressing, thereby providing an unbounded logical address space.

In addition, in one embodiment, each of the cache memories $C_1$ to $C_N$ may also be a cache memory that supports simultaneous/parallel reading and writing. That is, for each of the cache memories $C_1$ to $C_N$, a reading instruction for one cache area in the cache memory and a reading instruction for another cache area in the cache memory can be simultaneously issued to the cache memory, and enables writing data to a cache area in the cache memory in parallel with or at the same time as reading data from another cache area in the cache memory.

In the convolution processing engine CE according to an embodiment of the present disclosure, the serially connected cache memories $C_1$ to $C_N$ can be used to cache feature data from outside of the convolution processing engine CE (more generally referred to as tensor data, for example, an image or an image fragment) and intermediate result data and final result data generated by the operational circuit OC during its related operations.

For example, in the example of FIG. 1, the serially connected cache memories $C_1$ to $C_N$ can also be used to cache the operating parameters related to the operation to be performed by the operational circuit OC and from outside of the convolution processing engine CE (for example, the convolution kernel of the convolution layer and/or bias parameters, the pooling kernel of the pooling layer, etc.).

In another embodiment, the convolution processing engine CE may also comprise a separate cache memory $C_W$, which is independent of the cache memories $C_1$ to $C_N$ and is specifically used to cache for example operating parameters related to the operations to be performed by the operational circuit OC such as a convolution kernel of a convolution layer and/or bias parameters, a pooling kernel of a pooling layer and other.

Figure 7:
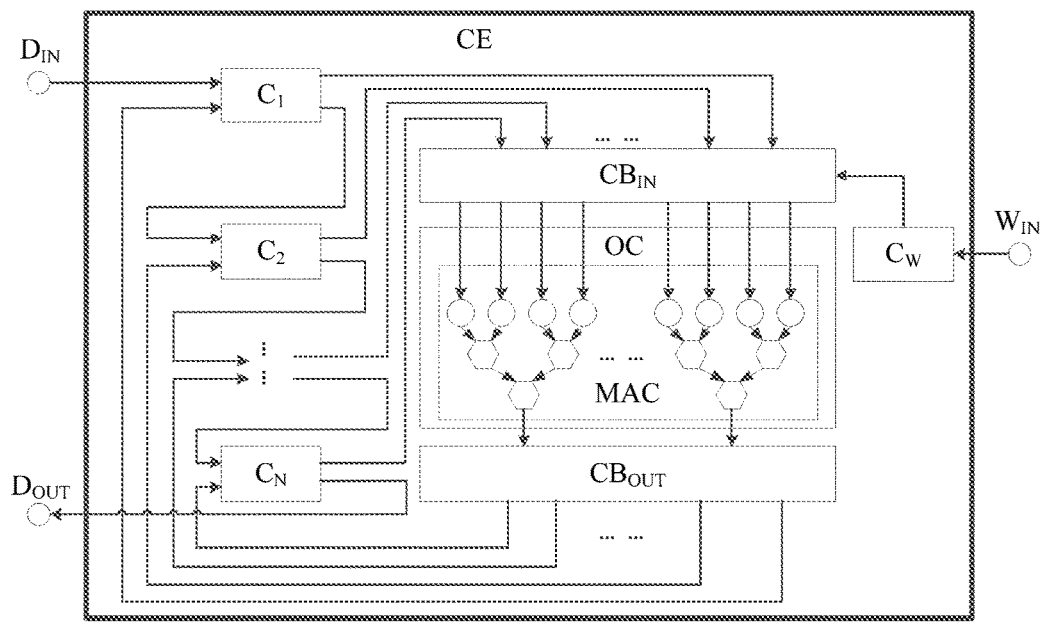
FIG. 7 shows an example of a convolution processing engine according to an embodiment of the present disclosure.

For example, as shown in FIG. 7, the input terminal of the cache memory $C_W$ may correspond to another input terminal $W_{IN}$ of the convolution processing engine CE (also referred to herein as the second input terminal of the convolution processing engine CE), and is specifically used to receive operation parameters such as a convolution kernel and/or bias parameter of a convolution layer outside the convolution processing engine CE, and a pooling kernel of a pooling layer.

According to different embodiments, the output terminal of the cache memory $C_W$ may be coupled to the input terminal of the operational circuit OC directly, or via an intermediary device such as a crossbar switch $CB_{IN}$ as shown in FIG. 7.

In the case that the convolution processing engine CE further comprises a separate cache memory $C_W$, the operational circuit OC may comprise two input terminals (each input terminal may actually comprise or correspond to one or more input ports or input pins), wherein one input terminal can be coupled to each of the cache memories $C_1$ to $C_N$ in order to receive feature data, and the other input terminal can be coupled to the cache memory $C_W$ to receive operating parameters.

Figure 8:
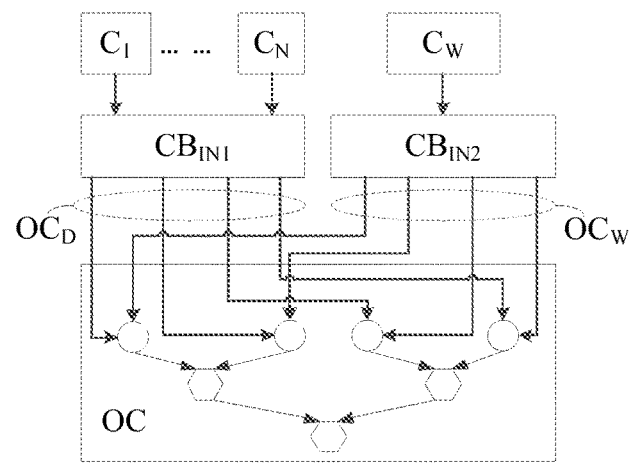
FIG. 8 shows an example of a part of a convolution processing engine according to an embodiment of the present disclosure.

For example, as shown in FIG. 8, the input terminal $OC_D$ of the operational circuit OC (only a simple example of the multiplier and accumulator array MAC is shown in FIG. 8) can be coupled to the output terminal of each of the cache memory $C_1$ to $C_N$ via a common crossbar switch $CB_{IN}$ or a separate crossbar switch $CB_{IN1}$, and the input terminal $OC_W$ of the operational circuit OC may be coupled to the output terminal of the cache memory $C_W$ via a common cross switch $CB_{IN}$ or a separate cross switch $CB_{IN2}$.

According to different embodiments, the capacity of the cache memory $C_W$ may be the same as or different from the capacity of each of the cache memories $C_1$ to $C_N$.

In addition, in one embodiment, the cache memory $C_W$ may be a cache memory that supports circular addressing, thereby supporting an unbounded address space.

In the convolution processing engine CE according to an embodiment of the present disclosure, there is no need to separately provide an input cache memory and an output cache memory for the operational circuit OC, and only one cache memory $C_1$ is used to receive and cache the external data of the convolution processing engine CE, and only one cache memory $C_N$ is used to output data to the outside of the convolution processing engine CE, so it is possible to reduce the connecting line between each cache memory and other components in the convolution processing engine CE and the external components (for example, off-chip memory) of the convolution processing engine CE, while reducing the control logic of data transmission, thereby can greatly reduce the complexity of hardware settings and software control and help reduce power consumption.

Exemplary Convolutional Neural Network Accelerator

Figure 9:
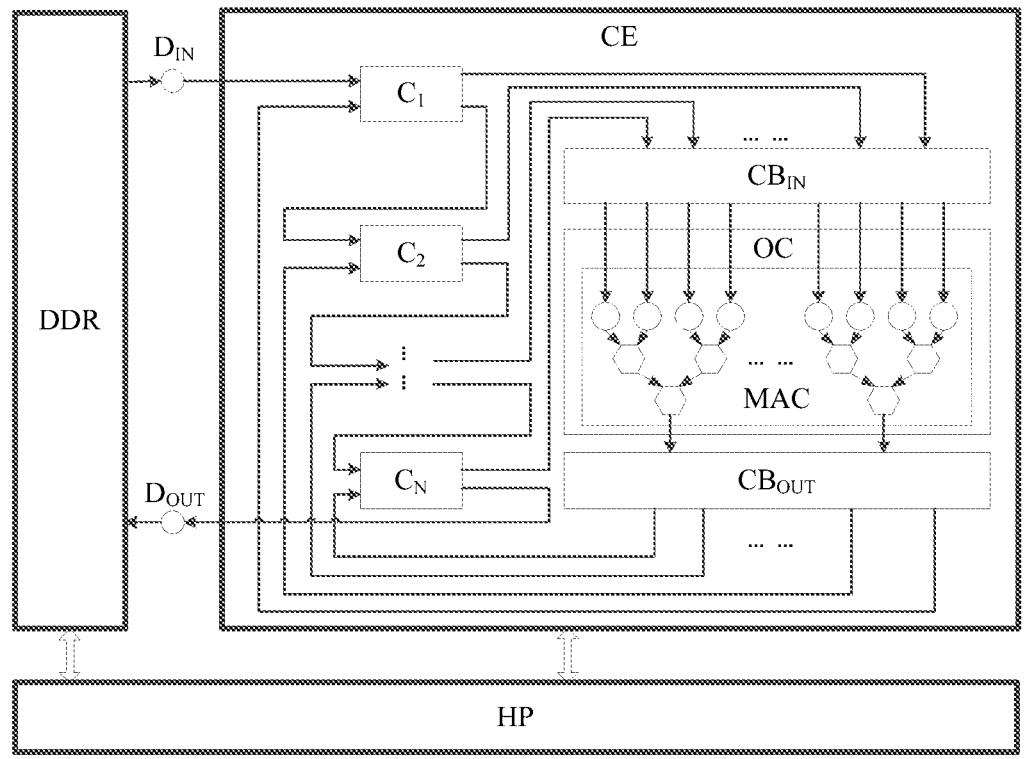
FIG. 9 shows an example of a convolutional neural network accelerator according to an embodiment of the present disclosure.

FIG. 9 shows an example of a convolutional neural network accelerator according to an embodiment of the present disclosure.

In the example of FIG. 9, the convolutional neural network accelerator may comprise, for example, the convolution processing engine CE shown in FIG. 1 (the examples in FIGS. 2 to 6 may also be combined), wherein, for example, the convolution processing engine CE may exchange data (comprising feature data and operating parameters) and perform operations with an off-chip memory (for example, off-chip dynamic random access memory) DDR via an input terminal $D_{IN}$ and an output terminal $D_{OUT}$ under the control of the controller HP.

Figure 10:
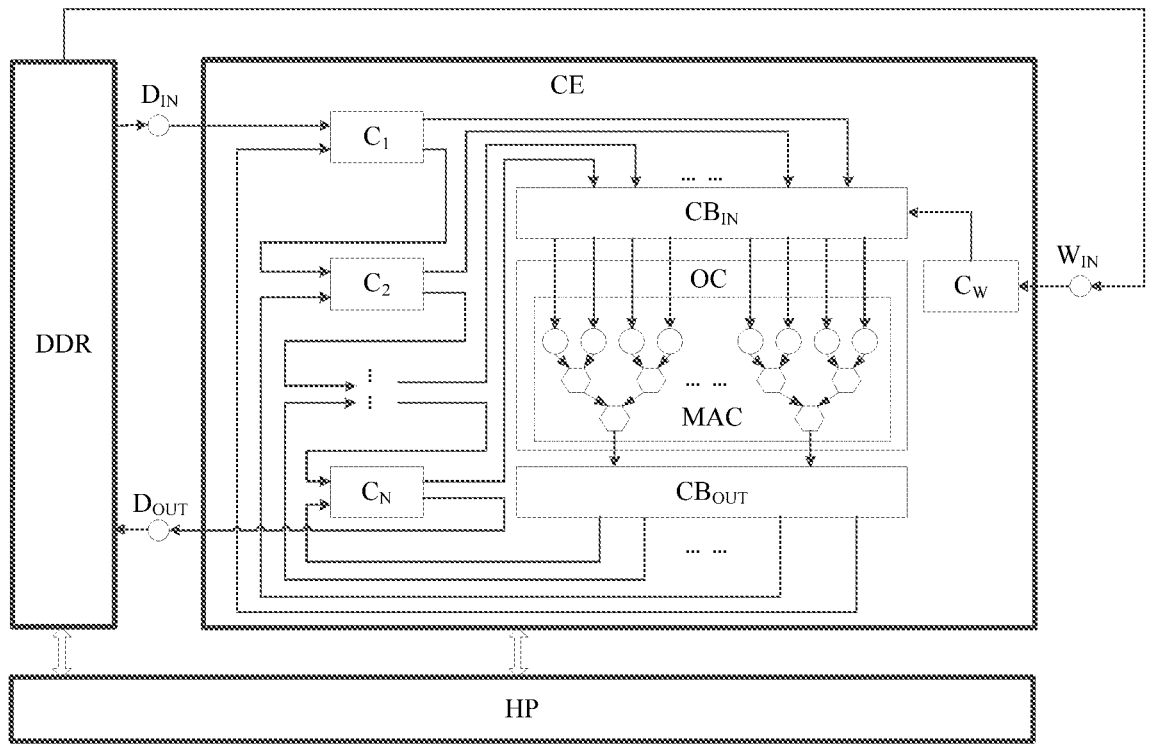
FIG. 10 shows an example of a convolutional neural network accelerator according to an embodiment of the present disclosure.

FIG. 10 shows another example of a convolutional neural network accelerator according to an embodiment of the present disclosure.

In the example of FIG. 10, the convolutional neural network accelerator may comprise, for example, the convolution processing engine CE shown in FIG. 7 (which can also be combined with the examples of FIGS. 2 to 6), wherein the convolution processing engine CE may, for example, under the control of the host controller HP, exchange feature data with the off-chip memory DDR via the input terminal $D_{IN}$ and the output terminal $D_{OUT}$, and receives operating parameters from the off-chip memory DDR via the input terminal $W_{IN}$, and then perform operations based on the feature data cached in the cache memories $C_1$ to $C_N$ and the operating parameters cached in the cache memory $C_W$.

In another embodiment, the convolutional neural network accelerator may comprise multiple convolution processing engines, and may also comprise multiple off-chip memories.

Figure 11:
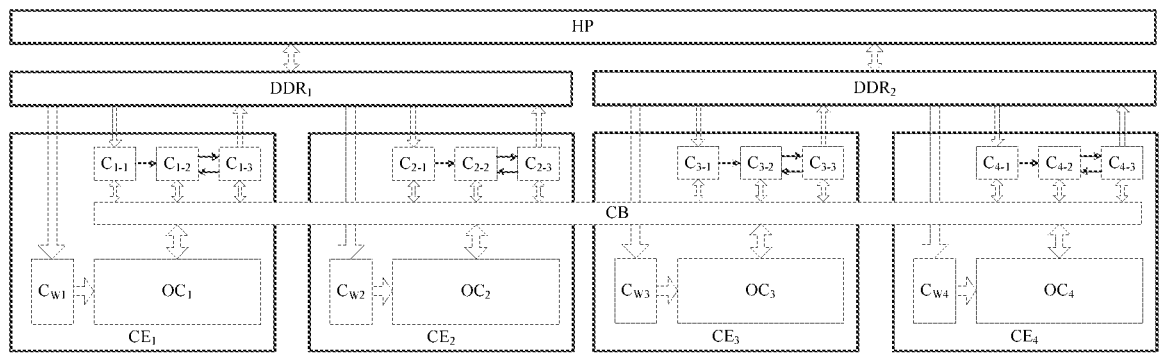
FIG. 11 shows an example of a convolutional neural network accelerator according to an embodiment of the present disclosure.

For example, in the example of FIG. 11, the convolutional neural network accelerator may comprise 2 off-chip memories $DDR_1$ and $DDR_2$ and 4 convolution processing engines $CE_1$ to $CE_4$, and each convolution processing engine $CE_k$ (k is any integer greater than or equal to 1 and less than or equal to 4) comprises an operational circuit $OC_k$, a separate cache memory $CW_k$ for caching operating parameters, and three serially connected cache memories $C_{k-1}$ to $C_{k-3}$, wherein, the input terminal of the cache memory $C_{k-2}$ is also coupled to the output terminal of the cache memory $C_{k-3}$.

In addition, in the example of FIG. 11, the crossbar switch CB spans four convolution processing engines $CE_1$ to $CE_4$, and thus can be shared by three serially connected cache memories in each convolution processing engine. Such a configuration may allow one convolution processing engine to use the cache memory of another convolution processing engine.

For example, the operational circuit $OC_1$ may perform operations using data in the cache memories $C_{2-1}$ to $C_{2-3}$ in the convolution processing engine $CE_2$, and may cache the results of the operations into one or more of the cache memory $C_{3-1}$ to $C_{3-3}$ in the convolution processing engine $CE_3$.

In another embodiment, the crossbar switch CB in FIG. 11 can be replaced by a structure such as one four-to-one multiplexer and four two-to-one multiplexers.

In addition, an intermediary component such as a cross switch or a multiplexer may not be used, rather a direct connection/coupling method may be utilized.

It should be understood that FIGS. 9 to 11 are only examples of convolutional neural network accelerators according to embodiments of the present disclosure. The convolutional neural network accelerator according to an embodiment of the present disclosure may also comprise other components/elements/modules/circuits such as interrupt controllers, timers, etc., or other structures or connections.

In the convolutional neural network accelerator according to an embodiment of the present disclosure, there is only one cache memory (ie, the cache memory $C_1$ in the convolution processing engine) or two cache memories (ie, the cache memory $C_1$ and the cache memory $C_W$ in the convolution processing engine) inputting/reading data from an off-chip memory DDR, and only one cache memory (ie, the cache memory $C_N$ in the convolution processing engine) outputting/writing data to the off-chip memory DDR. Therefore, as a whole, both the hardware design complexity and software control complexity of the convolutional neural network accelerator according to the embodiments of the present disclosure are relatively low.

In addition, the convolutional neural network accelerator according to an embodiment of the present disclosure may be applied to an artificial intelligence chip.

Exemplary Method

Figure 12:
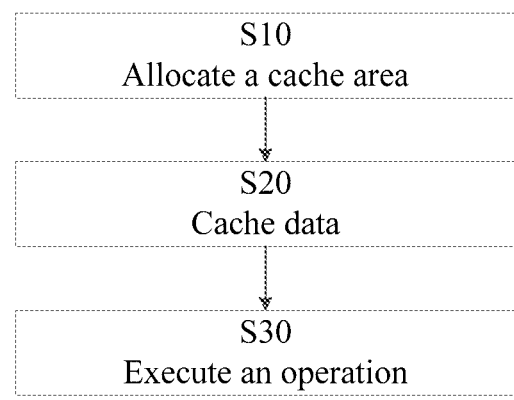
FIG. 12 shows an example of a method for controlling a convolution processing engine according to an embodiment of the present disclosure.

FIG. 12 illustrates a method for controlling any of the above-mentioned convolution processing engines according to an embodiment of the present disclosure. As shown in FIG. 12, the method according to an embodiment of the present disclosure may comprise steps S10 (allocating a cache area), S20 (caching data), and S30 (executing an operation).

In step S10, according to an embodiment of the present disclosure, it can be determined that there is a correspondence between the at least two consecutive layers in the convolutional neural network to be processed and the serially connected cache memories $C_1$ to $C_N$ in the convolution processing engine according to the embodiment of the present disclosure, that is, for the feature data or part of the feature data involved in the operation in each of the at least two layers, the corresponding caches areas are allocated from the allocation cache memories $C_1$ to $C_N$, wherein the input feature data of the first layer of the at least two layers can correspond to the cache memory $C_1$, and the output feature data of the last layer of the at least two layers can correspond to the cache memory $C_N$.

Then, in step S20, according to an embodiment of the present disclosure, the first input feature data may be received from an outside of the convolution processing engine and stored into a corresponding portion of the cache memory $C_1$, and the first input feature data may be the first partial feature data of the original and complete input feature data of the first layer.

Then, in step S30, according to an embodiment of the present disclosure, the operational circuit in the convolution processing engine can be controlled to perform a first operation.

In one embodiment, the first operation may comprise: 1. reading the first input feature data from the corresponding portion of the cache memory $C_1$; 2. based on the read first input feature data, executing the operation of each layer starting from the first layer in turn; and 3. storing the first output feature data obtained by the operation of each layer into the corresponding portion of the corresponding cache memory.

For example, the first operation may correspond to an instruction sequence, which may execute the above-mentioned operations 1 to 3 in sequence.

In one embodiment, the method according to an embodiment of the present disclosure may further comprise: during the first operation, receiving second input feature data from an outside of convolution processing engine and storing it in a second corresponding portion of the cache memory $C_1$. The second input feature data is second partial data of the original and complete input feature data of the first layer; and controlling the operational circuit in the convolution processing engine to perform a second operation, which is similar to the first operation.

In one embodiment, the second operation may comprise: 1'. reading the second input feature data from the second corresponding portion of the cache memory C1; 2'. executing the operation of each layer in turn based on the read second input feature data starting from the first layer; and 3'. storing the second output feature data obtained by the operation of each layer into the corresponding portion of the corresponding cache memory.

For example, the second operation may correspond to an instruction sequence, which may execute the operations 1' to 3' in sequence.

In one embodiment, the method according to an embodiment of the present disclosure may further comprise: during the second operation, outputting the first output feature data stored into the last layer in the corresponding portion of the cache memory $C_N$ during the first operation to the outside of the convolution processing engine.

The method according to an embodiment of the present disclosure can be applied to the host controller in the convolutional neural network accelerator (for example, the host controller HP in the example of FIGS. 9 to 10), for example, executed by the host controller in the convolutional neural network accelerator alone or together with the assistance of other components such as timers, interrupt controllers, storage controllers, off-chip data transfer controllers, and so on.

Accordingly, the method according to an embodiment of the present disclosure and each step or sub-step in the method may execute one or more sequences of program instructions corresponding to the host controller in the convolutional neural network accelerator according to an embodiment of the present disclosure.

Therefore, the method according to an embodiment of the present disclosure can practically be characterized as an instruction debugging method, and various input data involved in the processing of each step or sub-step can correspond to or be converted into parameters (for example, the address code part) of one or more instructions, and the instructions involved may comprise, for example, instructions for addressing, data reading, and data writing directed to a memory/buffer memory, and instructions for instructing the operational circuit to start and execute operation.

The logic of the method according to the present disclosure is simple, which is beneficial to reducing the control logic of the convolutional neural network accelerator, thereby reducing software complexity.

For example, since the correspondence between at least two consecutive layers in the convolutional neural network to be processed and the serially connected cache memories $C_1$ to $C_N$ in the convolution processing engine according to an embodiment of the present disclosure can be determined in step S10, therefore, the control of the cache memory can be reduced, for example, the control on the read hit rate of the cache memory can be reduced or even omitted.

In addition, the method according to the present disclosure allows to use pipeline type control, so that the serially connected cache memories $C_1$ to $C_N$ in the convolution processing engine according to an embodiment of the present disclosure can be fully utilized, and there is no need for the operational circuit in the convolution processing engine to wait for reading and writing operations on the memory external to the convolution processing engine, but always maintain high-efficiency operation, which can greatly improve the operating efficiency of the convolution processing engine.

More details in the method according to an embodiment of the present disclosure are described below in conjunction with examples.

Regarding step S10, in one embodiment, the feature data to be processed (which may be original feature data from outside of the network, or may be output data of a previous layer of the network) by each layer in the convolutional neural network can be predicted in advance during the designing of the convolutional neural network and the sizes and dimensions of the output data (which can be output to the outside of the network as the final output result, or can be provided to the next layer of the network as the input feature data of the next layer of the network), therefore, the correspondence between at least two consecutive layers in the convolutional neural network and the cache memories $C_1$ to $C_N$ can be determined during designing the convolutional neural network.

Then, during operation, the host controller in the convolutional neural network accelerator can, according to the correspondence determined in advance, for each feature data (or part of the feature data) of each layer currently concerned, allocating the corresponding cache area from the cache memory $C_1$ to $C_N$.

In another embodiment, for each feature data (or part of feature data) of each layer currently concerned, a corresponding cache area is allocated from the cache memories $C_1$ to $C_N$ by the host controller in the convolutional neural network accelerator based on the actual size of the feature data of each layer currently concerned (for example, it can be determined by the runtime program and according to the runtime data).

The actual feature data processed by convolutional neural networks is usually very large. For example, a color picture with a resolution of 1280*720 usually requires storage space of at least 2.6 MB (megabytes). However, in order to make the reading speed of the cache memory faster, the maximum capacity of the cache memory is usually much smaller than the size of the feature data, for example, which may be only 128 KB (kilobytes).

Therefore, during the actual operation, it may be necessary to split the feature data to be processed by each layer of the convolutional neural network into multiple partial feature data, so that the cache space required by each partial feature data is less than or equal to the maximum capacity of each cache memory.

Further, it may be required that the total size of the intermediate results of multiple layers concerned is less than or equal to the total capacity of the cache memories $C_1$ to $C_N$, so as to maximize the utilization rate of the cache memory or support the fusion processing of multi-layer calculation.

In one embodiment, the feature data in at least two layers in the convolutional neural network may be split into a plurality of partial feature data, and then in step S10, for the feature data of each of the at least two layers, the corresponding cache area is allocated from the cache memories $C_1$ to $C_N$.

In another embodiment, it is also possible to decide at least one partial data of the original and complete input feature data of the first layer of the at least two layers, so that the size of each partial data is less than or equal to half the capacity of the cache memory $C_1$, and the sum of the sizes of all feature data involved in all operations of the at least two layers is less than or equal to the total capacity of the cache memories $C_1$ to $C_N$ when each partial data is provided to the first layer.

Figure 13:
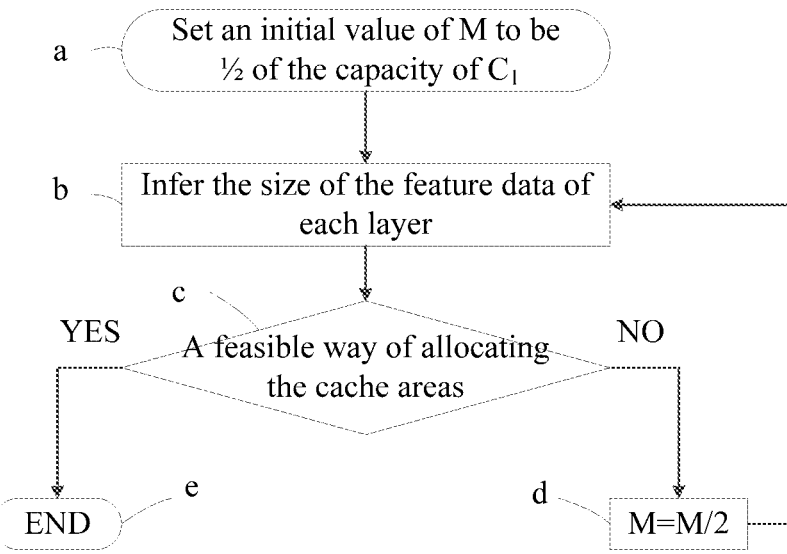
FIG. 13 shows an example of determining the size of partial feature data according to an embodiment of the present disclosure.

For example, the size of at least one partial data of the original and complete input feature data of the first layer of the at least two layers of the convolutional neural network can be determined according to steps a to e as shown in FIG. 13.

In step a, assuming M is used to represent the size of at least one partial data of the input feature data of the first layer, the at least one partial data will be cached in a continuous cache area of the cache memory $C_1$, and the initial value of M is ½ of the capacity of the cache memory $C_1$.

Then, in step b, the size of the feature data of each of the at least two layers can be determined according to the current M value. Since the structure of the neural network is already known, when the size of the input feature data is given, the size of the feature data of each layer can be inferred.

Then, in step c, it can be determined whether there is a feasible way of allocating the cache areas of the cache memories $C_1$ to $C_N$, as long as no conflict is introduced (for example, two feature data required by the current operation or feature data required by the current operation and feature data required by succeeding operation occupy the same cache area in the cache memories $C_1$ to $C_N$ at the same time and cause data overwritten or loss), the same cache area can be allocated to data of different layers.

If there is no feasible allocation method (the determining result of step c is "No"), it can continue to step d to change the value of M to M/2 (M=M/2) and then turn to the step b; otherwise (the determining result of step c is "Yes"), it can continue to step e, wherein it can be determined that the size of the aforementioned at least one partial data is the current value of M, and the processing ends.

In different embodiments, it is possible to use the structure of at least two layers currently concerned of the convolutional neural network (and possibly combing the structure of the cache memories $C_1$ to $C_N$), and use any appropriate methods such as enumeration, first adaptation method, optimal adaptation method, rapid adaptation method, random allocation method, etc., to determine the correspondence between the feature data of the at least two layers and the cache memories $C_1$ to $C_N$ or the feasible allocation method of the cache area of cache memories $C_1$ to $C_N$, wherein the corresponding cache memory of the input feature data of the first layer of the at least two layers can be the cache memory $C_1$, and the corresponding cache memory of the output feature data of the last layer of the at least two layers can be the cache memory $C_N$.

Figure 14:
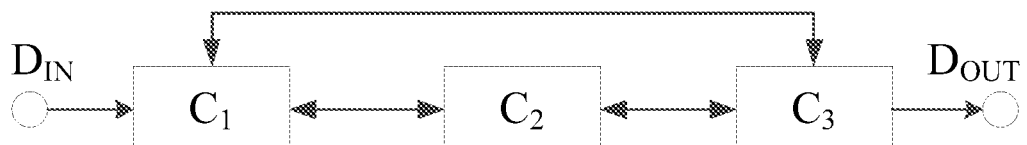
FIG. 14 shows an example of cache memories connected serially in a convolution processing engine according to an embodiment of the present disclosure.
Figure 15:
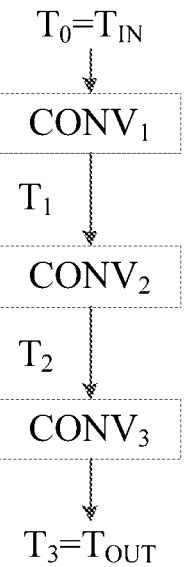
FIG. 15 shows an example of a convolutional neural network according to an embodiment of the present disclosure.
Figure 16:
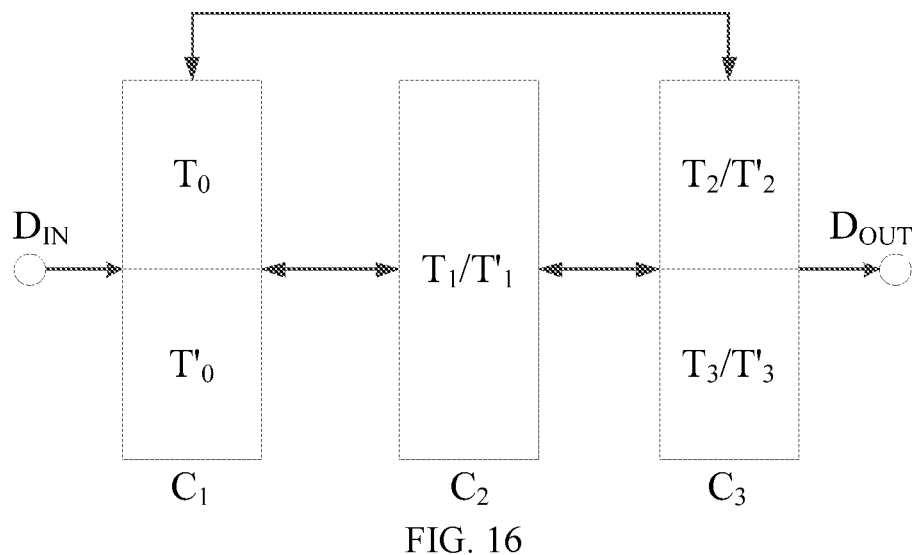
FIG. 16 shows an example of allocation method for the cache memory of the convolutional neural network shown in FIG. 15 based on the structure of the cache memories shown in FIG. 14 according to an embodiment of the present disclosure.

For example, in the case the serially connected cache memories $C_1$ to $C_N$ in the convolution processing engine according to an embodiment of the present disclosure are as shown in FIG. 14 and the convolutional neural network to be processed (which may be one fragment of a larger convolutional neural network) are as shown in FIG. 15, in step S10 of the control method according to an embodiment of the present disclosure, an example of the correspondence between the determined feature data involved in each convolutional layer in FIG. 15 and cache memories $C_1$ to $C_N$ in FIG. 14 is as shown in FIG. 16.

In the example of FIG. 14, in the convolution processing engine according to the embodiment of the present disclosure, three cache memories $C_1$ to $C_3$ are connected serially and are used to cache the feature data in the operation of the convolutional neural network, wherein each of the cache memories $C_1$ to $C_3$ supports simultaneous/parallel reading and writing, and any two of the cache memories $C_1$ to $C_3$ can exchange data in both directions (which is indicated by using a connecting line with arrows at both ends in FIG. 14), only the cache memory $C_1$ can receive data from the outside of the exemplary cache memory, and only the cache memory $C_3$ can output data to the outside of the exemplary cache memory.

In the convolutional neural network shown in FIG. 15 (which can be one fragment of a larger convolutional neural network), the convolutional layers $CONV_1$ and $CONV_3$ are the first and last layers, respectively. The input feature data $T_{IN}$ of the convolutional layer $CONV_1$ is $T_0$. The feature data $T_1$ is the output feature data of the convolutional layer $CONV_1$ and also the input feature data of the convolutional layer $CONV_2$. The feature data $T_2$ is the output feature data of the convolutional layer $CONV_2$ and is also the input feature data of the convolutional layer $CONV_3$. The output feature data $T_{OUT}$ of the convolutional layer $CONV_3$ is $T_3$. As mentioned above, the feature data $T_0$ can be the original and complete input feature data, or part of the original and complete input feature data.

Correspondingly, as shown in FIG. 16, in a feasible allocation method of the cache memory, a cache area of half capability of the cache memory $C_1$ may be used to cache the input feature data $T_0$ of the convolutional layer $CONV_1$. The cache area of the at least half capability of cache memory $C_2$ may be used to cache the feature data $T_1$, the cache area of half capability of the cache memory $C_3$ may be used to cache the feature data $T_2$, and the other cache area of half capability of the cache memory $C_3$ may be used to cache the output feature data $T_3$ of the convolutional layer $CONV_3$.

In the example of FIG. 16, the feature data $T'_0$ represents the input feature data provided to the convolutional layer $CONV_1$ after the feature data $T_0$, and the feature data $T_0$ and the feature data $T_0$ may respectively correspond to different parts of the complete input feature data supposed to be originally provided to the convolutional layer $CONV_1$, or may also correspond to different feature data provided to the convolutional layer $CONV_1$. Correspondingly, the feature data $T'_1$ to $T'_3$ respectively represent the respective feature data involved in the example convolutional neural network shown in FIG. 15 when the feature data $T'_0$ is provided to the convolutional layer $CONV_1$.

In one embodiment, a continuous cache area may be allocated to each corresponding feature data in each cache memory.

Figure 17:
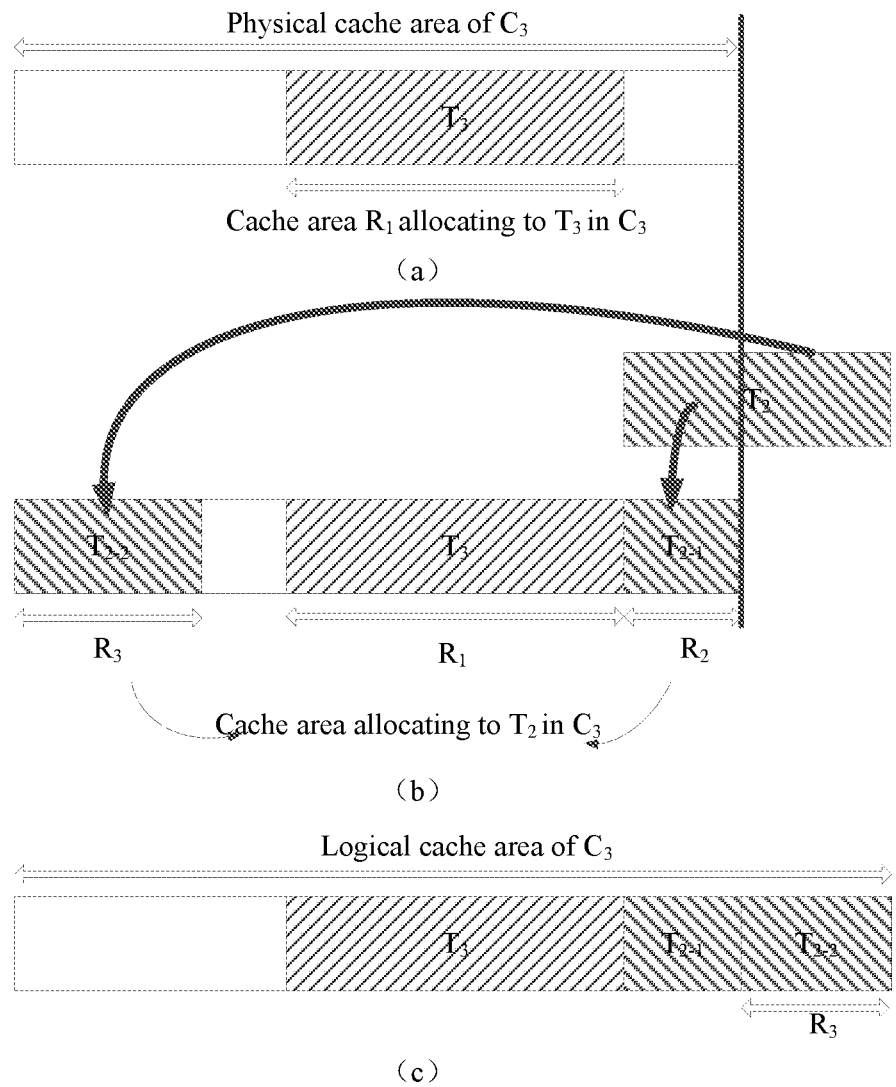
FIG. 17 shows an example of allocating a cache area in a cache memory according to an embodiment of the present disclosure.

In addition, in the case that each cache memory supports circular addressing, for example, as shown in parts (a) and (b) of FIG. 17, if the corresponding cache area $R_1$ for output feature data $T_3$ has been allocated in the cache memory $C_3$ (as shown in the left oblique shaded part in FIG. 17), and the cache area starting from the physical end address of the cache area $R_1$ to the physical end address $R_2$ of the cache memory $C_3$ is not enough to cache the feature data $T_2$, the cache area $R_2$ and the partial area $R_3$ starting from the physical head address of the cache memory $C_3$ may be allocated to the feature data $T_2$, and used to cache parts $T_{2-1}$ and $T_{2-2}$ of the feature data $T_2$, respectively. As shown in part (c) of FIG. 17, this is equivalent to expanding a cache area beyond the original cache area of the cache memory $C_3$, so as to realize an unbounded logical address space or logical cache area.

Figure 18:
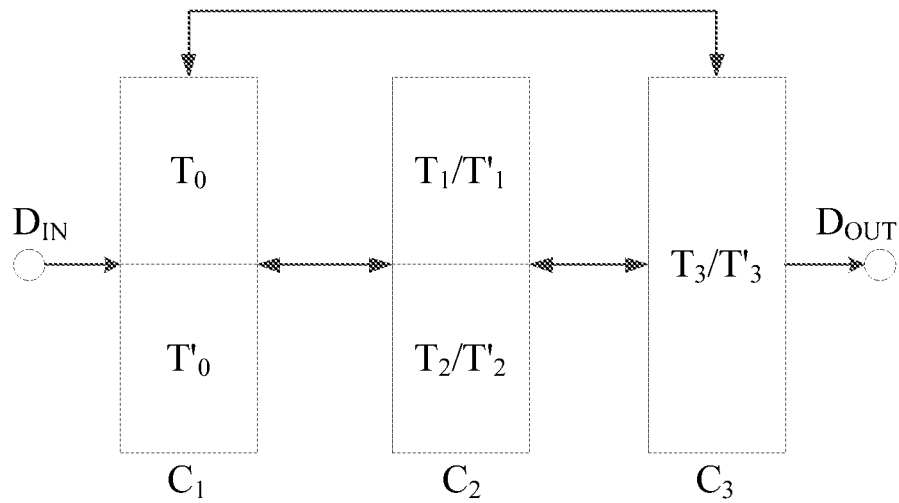
FIG. 18 shows an example of allocation method for the convolutional neural network shown in FIG. 15 based on the structure of the cache memories shown in FIG. 14 according to an embodiment of the present disclosure.

It should be understood that the example shown in FIG. 16 is not the only allocation method. For example, FIG. 18 shows another feasible allocation method in which half of the cache area in the cache memory $C_2$ may be used to cache the feature data $T_1$ while the other half of the cache area may be used to cache the feature data $T_3$, and at least half of the cache area in the cache memory $C_3$ may be used to cache the output feature data $T_3$ of the convolutional layer $CONV_3$.

Figure 19:
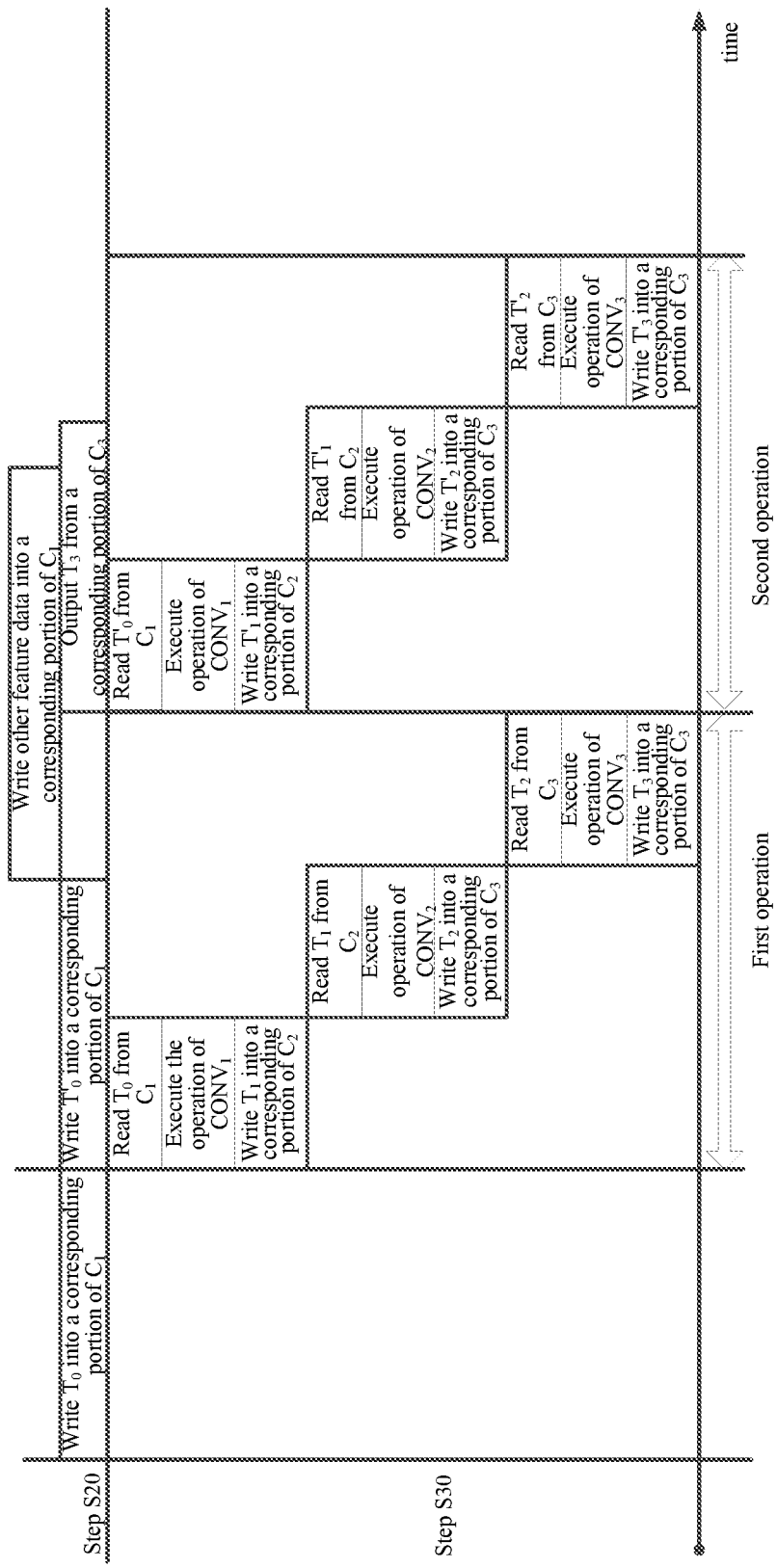
FIG. 19 shows an example of an execution process of a method according to an embodiment of the present disclosure.

Then, for the examples shown in FIGS. 14 to 16, an example of the execution process of the steps (comprising steps S20 and S30) after step S10 of the method according to an embodiment of the present disclosure may be as shown in FIG. 19.

In FIG. 19, the content in the thick-line box represents the operations performed in a certain period of time. If the time periods corresponding to the two thick-line boxes have overlapping parts, it means that the operations in one thick-line box can be executed in parallel or simultaneously during the execution of the operations in the other thick-line box.

In addition, in FIG. 19, one or more operations may be comprised in a thick-line box, and each operation is represented by a thin-line box. Multiple thin-line boxes in a thick-line box are shown as aligned with each other in FIG. 19, which means that the delay between multiple operations in a thick-line box is very small (at least much less than the time required for obtaining external data and caching external data to the cache memory $C_1$ or outputting the data in the cache memory $C_3$ to the outside) or there is no delay or can be regarded as no delay, or it can represent that multiple operations are fused, and executed together, and it can also mean that multiple operations are executed one after the other.

In the example shown in FIG. 19, for example, the host controller in the convolutional neural network accelerator according to an embodiment of the present disclosure may execute a first instruction (step S20), wherein the operation code of the first instruction may indicate that the feature data in an off-chip memory in the convolutional neural network accelerator is read into a corresponding portion of the cache memory $C_1$ in the convolution processing engine. According to different embodiments, the address code (or parameter) of the first instruction may be one or more pieces of information indicating the location of the feature data $T_0$ in the off-chip memory and the location of the corresponding portion of the cache memory $C_1$.

Then, the host controller may execute a second instruction (step S30), wherein the operation code of the second instruction may instruct the convolution processing engine in the convolutional neural network accelerator to perform the operation of the convolutional layer according to the specified data. According to different embodiments, the address code (or parameter) of the second instruction may indicate the location of the feature data $T_0$ in the cache memory $C_1$, and the operating parameters related to the operation of the convolutional layer $CONV_1$ (for example, it may indicate the location of operating parameters in the cache memory $C_W$) and one or more pieces of information of the location of the feature data $T_1$ in the cache memory $C_2$.

The operational circuit in the convolution processing engine may read the feature data To from the cache memory $C_1$ in response to receiving the second instruction from the host controller. For example, it may read the operation parameters related to the convolution layer $CONV_1$ from the cache memory $C_W$. The read feature data and operation parameters will be directly sent to the corresponding input terminals of each multiplier of the multiplier and accumulator array, and the output of the final addition of the multiplier and accumulator array will be directly sent to a preset location in the cache memory $C_2$.

Then, the host controller may execute a third instruction in response to detecting the output of the final addition of the multiplier and accumulator array (step S30). The operation code of the third instruction may be the same as the second instruction, but the address code (or parameter) may indicate one or more pieces of information on the location of the feature data $T_1$ in the cache memory $C_2$, the operation parameters related to the operation of the convolutional layer $CONV_2$ (for example, the location of the operation parameter in the cache memory $C_W$), and the location of the feature data $T_2$ in the cache memory $C_3$.

The operational circuit may read the feature data $T_1$ from the cache memory $C_2$ in response to receiving a third instruction from the host controller, for example, reading the operation parameters related to the convolutional layer $CONV_2$ from the cache memory $C_W$. The read feature data and operation parameters will be directly sent to the corresponding input terminals of each multiplier of, for example, the multiplier and accumulator array, and the output of the final addition of the multiplier and accumulator array will be directly sent to a preset location in the cache memory $C_3$.

Then, similarly, the host controller may execute a fourth instruction in response to detecting the output of the final addition of the multiplier and accumulator array (step S30). The operation code of the fourth instruction may be the same as the first instruction or the second instruction, but the address code (or parameter) may indicate one or more pieces of information on the location of the feature data $T_2$ in the cache memory $C_3$ and the operation parameters related to the operation of the convolutional layer $CONV_3$ (for example, the position of the operation parameter in the cache memory $C_W$ may be indicated), and the position of the feature data $T_3$ in the cache memory $C_3$.

The operational circuit may read the feature data $T_1$ from the cache memory $C_2$ and read the feature data $T_2$ from the cache memory $C_3$ in response to receiving the fourth instruction from the host controller, for example, reading operation parameters related to convolutional layer $CONV_3$ from the cache memory $C_W$. The read feature data and operation parameters will be directly sent to the corresponding input terminals of each multiplier of, for example, the multiplier and accumulator array, and the output of the final addition of the multiplier and accumulator array will be directly sent to a preset location in the cache memory $C_3$.

Thus, the operational circuit in the convolution processing engine may perform the first operation in step S30 in response to the second to fourth instructions from the host controller.

As shown in FIG. 19, in the process of the operational circuit executing the first calculation (step S30), the host controller may execute the fifth instruction (step S20), which has the same operation code as the first instruction and indicates that the feature data in the off-chip memory in the convolutional neural network accelerator is read into the corresponding portion of the cache memory $C_1$ in the convolution processing engine, but the address code (or parameter) of the fifth instructions may indicate one or more pieces of information on the location in the off-chip memory and the location of the corresponding portion of the cache memory $C_1$ of the feature data $T_0$.

As shown in FIG. 19, the operational circuit can immediately start processing for the feature data $T'_0$ immediately after completing the execution of the processing for the feature data $T_0$ and writing the obtained feature data $T_3$ into the corresponding portion of the cache memory $C_3$ (step S30, the second calculation). This process is similar to that of the first operation, and will not be repeated here.

As shown in FIG. 19, the host controller may execute a sixth instruction during the execution of the second operation by the running circuit. The operation code of the sixth instruction may instruct to write $T_3$ in the cache memory $C_3$ into the off-chip memory in the convolutional neural network accelerator. According to different embodiments, the address code (or parameter) of the sixth instruction may be one or more pieces of information indicating the location of the feature data $T_3$ in the cache memory $C_3$ and the address of the off-chip memory to be written.

In addition, if the off-chip memory also comprises feature data $T''_0$ (ie, "other data" in FIG. 19), the host controller may execute a seventh instruction, for example, in parallel with the execution of the sixth instruction during the operation of the first operation and/or the second operation by the circuit. The seventh instruction has the same operation code as the first instruction, indicating that the feature data in the off-chip memory in the convolutional neural network accelerator is read to the corresponding portion of the cache memory $C_1$ in the convolution process engine, but the address code (or parameter) of the seventh instruction can indicate one or more of the information on the location of the feature data $T''_0$ in the off-chip memory and the location of the corresponding portion of the cache memory $C_1$.

As shown in FIG. 19, through the method according to an embodiment of the present disclosure, pipeline type control can be implemented, so that the processing efficiency of the convolution processing engine can be greatly improved. Moreover, as long as the time required to output the feature data from the cache memory $C_3$ to the off-chip memory is less than or equal to the execution time of the first operation or the second operation, the operational circuit in the convolution processing engine can be always in a running state after starting to run responding to instructions from the host controller, without waiting for data exchange with the off-chip memory.

Figure 20:
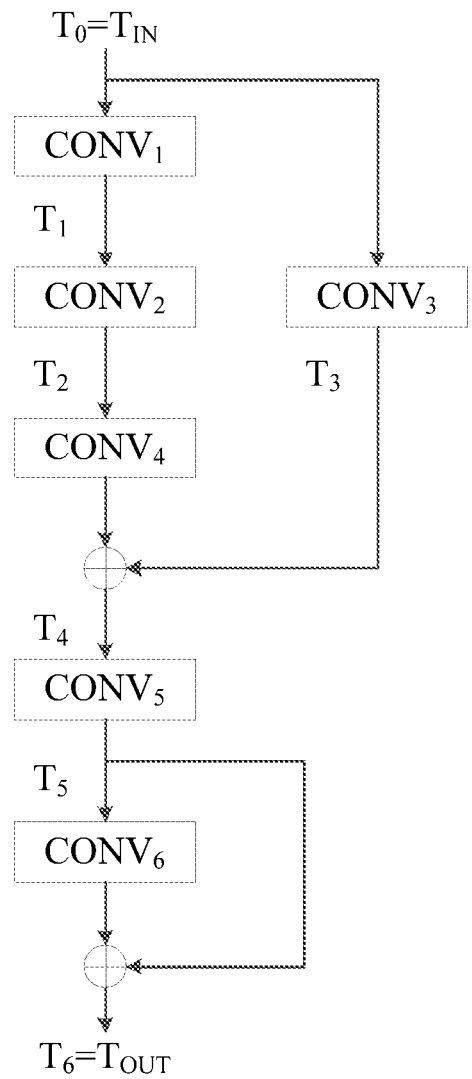
FIG. 20 shows another example of a convolutional neural network according to an embodiment of the present disclosure.

In another example, the cache memories connected serially $C_1$ to $C_N$ in the convolution processing engine according to an embodiment of the present disclosure are shown in FIG. 14 and the convolutional neural network to be processed (which may be a larger segment of a convolutional neural network) is as shown in FIG. 20. In step S10 of the control method according to an embodiment of the present disclosure, an example of the correspondence relationship between the feature data involved in each convolutional layer in FIG. 20 and the cache memories $C_1$ to $C_N$ in FIG. 14 may be as shown in FIG. 21.

In the convolutional neural network shown in FIG. 20 (which may be a fragment of a larger convolutional neural network), the input feature data $T_{IN}$ of the convolutional layer $CONV_1$ is To; the feature data $T_1$ is the output feature data of the convolutional layer $CONV_1$ and the input feature data of the convolution layer $CONV_2$; feature data $T_2$ is the output feature data of the convolution layer $CONV_2$ and the input feature data of the convolution layer $CONV_4$; feature data $T_3$ is the output feature data of the convolution layer $CONV_3$. The output feature data of the convolution layer $CONV_4$ and feature data $T_3$ are added pointwise to obtain the input feature data $T_4$ of the convolution layer $CONV_5$. The feature data $T_5$ is the output feature data of the convolution layer $CONV_5$ and the input feature data of the convolution layer $CONV_6$. The output feature data of the convolution layer $CONV_6$ and the feature data $T_5$ are added pointwise to obtain the output feature data $T_{OUT}$, that is, $T_6$.

Figure 21:
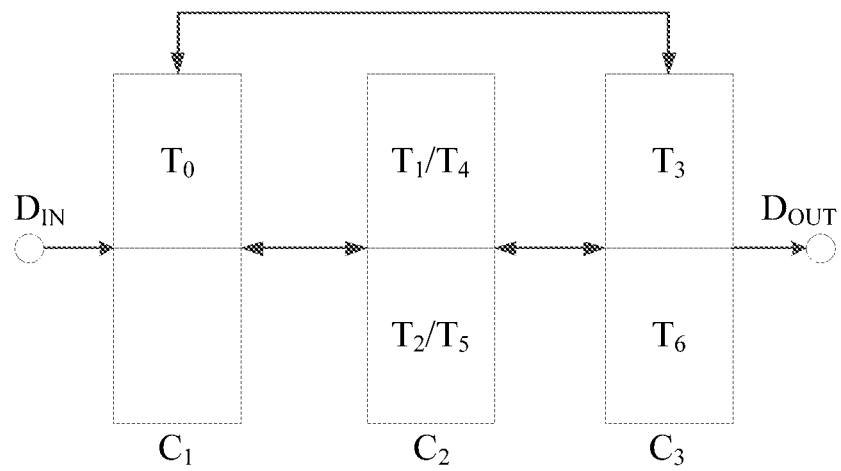
FIG. 21 shows an example of allocation method for the convolutional neural network shown in FIG. 20 based on the structure of the cache memories shown in FIG. 14 according to an embodiment of the present disclosure.

Correspondingly, in step S10 of the method according to an embodiment of the present disclosure, a possible cache allocation manner as shown in FIG. 21 may be determined, wherein half of the cache area in the cache memory $C_1$ may be used for the cache feature data $T_0$, and half of the cache area in the cache memory $C_2$ may be used to cache feature data $T_1$ or T4 (that is, feature data $T_1$ and $T_4$ share the same cache area, and allow succeeding feature data T4 to overwrite the previous feature data $T_1$). The other half of the cache area in the cache memory $C_2$ may be used to cache the feature data $T_2$ or $T_5$ (that is, the feature data $T_2$ and $T_5$ share the same cache area, and allow the succeeding feature data $T_5$ to overwrite the previous feature data $T_2$). Half of the cache area in the cache memory $C_3$ may be used to cache the feature data $T_3$, and the other half of the cache area in the cache memory $C_3$ may be used to cache the feature data $T_6$.

Figure 22:
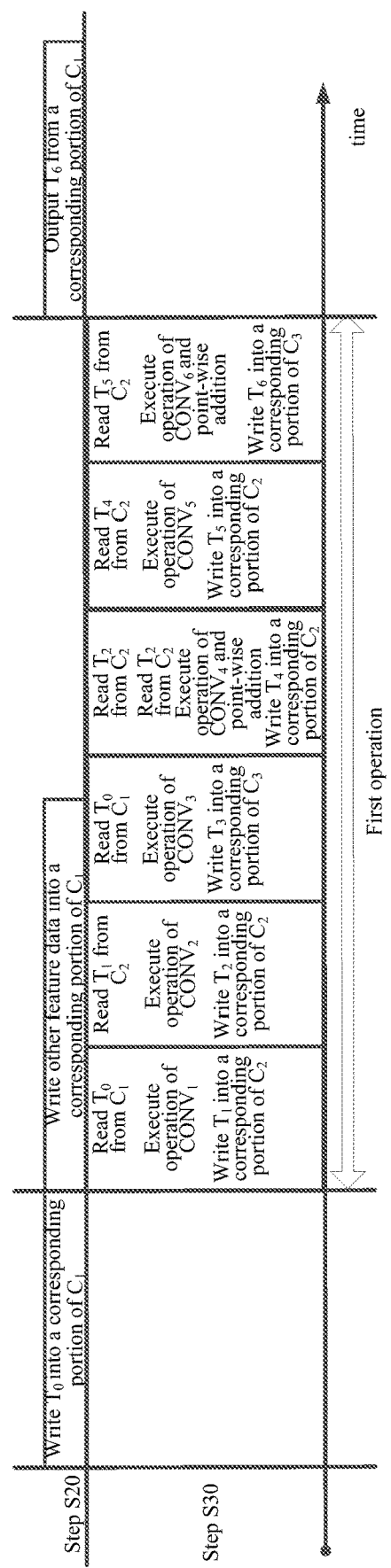
FIG. 22 shows an example of an execution process of a method according to an embodiment of the present disclosure.

Then, for the examples shown in FIG. 20 to FIG. 21, an example of the execution process of the steps (comprising steps S20 and S30) after step S10 of the method according to an embodiment of the present disclosure may be as shown in FIG. 22.

In FIG. 22, for simplicity, the details of the second operation are not shown, and all the boxes in the first operation are represented in the same row, without using the thick or thin line boxes to distinguish between those operations executed in the same time period. However, it should be understood that the operation process shown in FIG. 12 may be described similarly to FIG. 19, and therefore it will not be repeated.

Similarly, as shown in FIG. 22, through the method according to an embodiment of the present disclosure, pipeline type control can be implemented, so that the processing efficiency of the convolution processing engine can be greatly improved. Moreover, as long as the time required to output the feature data from the cache memory $C_3$ to the off-chip memory is less than or equal to the execution time of the first operation or the second operation, the operational circuit in the convolution processing engine can maintain a running state after responding to instructions from the host controller, without waiting for data exchange with the off-chip memory.

It should be understood that the execution process of the method according to the embodiments of the present disclosure is not limited to the above examples and the exemplary instruction forms and execution processes in the above examples.

For example, in another embodiment, the host controller may also issue an instruction to the convolution processing engine or the operational circuit in the convolution processing engine after reading the feature data To from the off-chip memory, and the convolution processing engine or the operational circuit may determine an instruction sequence in response to receiving the instruction, and execute the first operation in step S30 by executing the instruction sequence.

Exemplary computer program product and computer readable storage medium

In addition to the above methods and devices, the embodiments of the present disclosure may also be computer program products comprising program instructions that, when run by, for example, a host controller in a convolutional neural network accelerator, cause the host controller to execute any of the steps in the method for controlling a convolution processing engine according to an embodiment of the present disclosure described in the "Exemplary Method" section.

Regarding the computer program product, the program codes for carrying out the operations of embodiments of the present disclosure can be complied in any combination of one or more programming languages, which comprise object-oriented programming languages, such as Java, C++, etc., as well as conventional procedural programming language, such as "C" language or similar programming language.

In addition, the embodiment of the present disclosure may also be a computer-readable storage medium, such as a computer-readable non-transitory storage medium, on which program instructions are stored, upon execution of which by, for example, a host controller in a convolutional neural network accelerator such that the host controller executes the steps in any method for controlling the convolution processing engine according to the embodiment of the present disclosure described in the above-mentioned "Exemplary Method" section of this disclosure.

The computer-readable storage medium may adopt any combination of one or more readable media. The readable medium may be a readable signal medium or a readable storage medium. The readable storage medium may comprise, but is not limited to, a system, a device, or an equipment of an electrical, magnetic, optical, electromagnetic, infrared, or semiconductor, or a combination of any of the above. More specific examples (non-exhaustive list) of readable storage media comprise: electrical connections with one or more wires, portable disks, hard disks, random access memory (RAM), read only memory (ROM), erasable type programmable read-only memory (EPROM or flash memory), optical fiber, portable compact disk read-only memory (CD-ROM), optical memory, magnetic memory, or any suitable combination of the above.

The basic principles of the present disclosure are described above in conjunction with specific embodiments. However, it should be pointed out that the advantages, merits, effects, etc. mentioned in the present disclosure are merely examples and not limitations, and these cannot be considered as essential for each embodiment of the present disclosure. In addition, specific details disclosed hereinabove are only for the purpose of explanation and ease of understanding, rather than limitations, and it is not necessary for the present disclosure to be implemented by using the specific details hereinabove.

The block diagrams of the device, apparatus, equipment, and systems involved in the present disclosure are merely illustrative examples and are not intended to require or imply that they must be connected, arranged, and configured in the manner shown in the block diagrams. As those skilled in the art will recognize, these device, apparatus, equipment, and systems can be connected, arranged, and configured in any manner. Terms such as "comprising", "including", "having", etc. are to be construed in an inclusive sense, meaning "comprising but not limited to", and can be used interchangeably. The terms "or" and "and" used herein refer to the term "and/or" and can be used interchangeably, unless the context clearly indicates otherwise. The term "such as" used herein refers to the phrase "such as but not limited to", and can be used interchangeably.

It should also be understood that depending on the actual hardware specifications/implementation of the device/component/circuit/module/unit, the "input terminal" of the device/component/circuit/module/unit mentioned herein may actually comprise one or more writing/inputting ports of the device/component/circuit/module/unit, and the "output terminal" of the device/component/circuit/module/unit may actually comprise one or more reading/outputting ports of the device/component/circuit/module/unit. For example, the input terminal of a cache memory may refer to one or more data input pins of the cache memory for receiving data.

In addition, herein, "directly connected" or "directly coupled" is used to emphasize that there is no other intermediary object between the devices/components/circuits/modules/units serving as connecting objects. "Connected" or "coupled" herein generally means "directly connected" or "directly coupled", but does not exclude "indirect connected" or "indirect coupled" (ie, between two or more connecting objects there can be one or more intermediary objects). In the example of the drawings, for simplicity, only direct connection or direct coupling is shown, but it should be understood that in other embodiments, the connecting or coupling shown in the drawings may also adopt indirect connecting or indirect coupling.

However, when it is mentioned that an input or output terminal of one of the cache memories $C_m$ (m is any integer greater than or equal to 1 and less than or equal to N) among the cache memories $C_1$ to $C_N$ is connected or coupled to an output terminal or input terminal of another cache memory $C_n$ among $C_1$-$C_N$ (n is an integer greater than or equal to 1 and less than or equal to N, and n is not equal to m), it means the input terminal or the output terminal of the cache memory $C_m$ is directly connected or coupled to the output terminal or input terminal of the cache memory $C_n$, or the input terminal or output terminal of the cache memory $C_m$ is connected or coupled to the output terminal or input terminal of the cache memory $C_n$ via an intermediary device/module/circuit/component and the intermediary device/module/circuit/component is not one or more of the cache memories $C_1$ to $C_N$.

In addition, in the apparatuses, devices and methods of the present disclosure, each component or each step can be decomposed and/or recombined. These decomposed and/or recombined ones should be regarded as equivalent solutions of the present disclosure.

The above description of the disclosed aspects is provided to enable a person skilled in the art to achieve or make use of the present disclosure. Various modifications to these aspects are very obvious to those skilled in the art, and the general principles defined herein can be applied to other aspects without departing from the scope of the present disclosure. Therefore, the present disclosure is not intended to be limited to the aspects shown herein, but shall be expounded in accordance with the broadest scope consistent with the principles and novel technical features disclosed herein.

The above description has been given for the purposes of illustration and description. However, the embodiments of the present disclosure are not intended to be limited to the forms disclosed herein. Although a number of example aspects and embodiments have been discussed above, those skilled in the art will make certain variations, modifications, changes, additions, and sub-combinations thereof.

What is claimed is:

1. A convolution processing engine, comprising:
    at least two cache memories connected in series, wherein, for a preceding cache memory and a succeeding cache memory in any two adjacent cache memories, an output terminal of the preceding cache memory is coupled to an input terminal of the succeeding cache memory, and an input terminal of a first cache memory connected serially at a first position and an output terminal of a second cache memory connected serially at a last position correspond to a first input terminal and an output terminal of the convolution processing engine respectively, and wherein, among the at least two cache memories, the first cache memory is used to receive and cache data from an outside of the convolution processing engine, and the second cache memory is used to output the cached data to an outside of the convolution processing engine; and
    an operational circuit comprising a multiplier-accumulator array, wherein an input terminal of the operational circuit is coupled to an output terminal of each of the at least two cache memories, and an output terminal of the operational circuit is coupled to an input terminal of each of the at least two cache memories.

2. The convolution processing engine of claim 1, wherein, an output terminal of the first cache memory is coupled to input terminals of one or more cache memories that are different from the first cache memory, among the at least two cache memories.

3. The convolution processing engine of claim 1, wherein, an input terminal of the second cache memory is coupled to output terminals of one or more cache memories that are different from the second cache memory, among the at least two cache memories.

4. The convolution processing engine of claim 1, wherein, the at least two cache memories further comprise a third cache memory, an input terminal of which is coupled to output terminals of one or more cache memories that are different from the third cache memory, among the at least two cache memories.

5. The convolution processing engine of claim 4, wherein, an output terminal of the third cache memory is coupled to input terminals of one or more cache memories that are different from the first cache memory and the third cache memory, among at least two cache memories.

6. The convolution processing engine of claim 5, wherein, an output terminal of the third cache memory is further coupled to an input terminal of the first cache memory.

7. The convolution processing engine of claim 1, wherein, a capacity of each of the at least two cache memories is the same.

8. The convolution processing engine of claim 1, wherein, each of the at least two cache memories is a circular addressing cache memory.

9. The convolution processing engine of claim 1, further comprising:
    a cache memory independent of the at least two cache memories, an input terminal of which corresponds to a second input terminal of the convolution processing engine, and an output terminal thereof is coupled to another input terminal of the operational circuit.

* * * * *